United States Patent [19]

Connell et al.

[11] Patent Number: 5,182,356
[45] Date of Patent: Jan. 26, 1993

[54] POLY(1,2,4-TRIAZOLE) VIA AROMATIC NUCLEOPHILIC DISPLACEMENT

[75] Inventors: John W. Connell; Paul M. Hergenrother, both of Yorktown, Va.; Peter Wolf, Frankenthal, Fed. Rep. of Germany

[73] Assignee: The United States of America as represented by the United States National Aeronautics and Space Administration, Washington, D.C.

[21] Appl. No.: 650,336

[22] Filed: Jan. 24, 1991

[51] Int. Cl.$^5$ .............................................. C08G 73/08
[52] U.S. Cl. .................................. 528/128; 528/125; 528/126; 528/168; 528/169; 528/172; 528/174; 528/210; 528/211; 528/214; 528/215; 528/216; 528/220; 528/228; 528/423; 548/262.2
[58] Field of Search ............... 528/128, 125, 126, 168, 528/169, 172, 174, 210, 211, 214, 215, 216, 220, 228, 423

[56] References Cited

U.S. PATENT DOCUMENTS 4,987,228 1/1991 Cantatore et al. .................... 528/423

Primary Examiner—Harold D. Anderson
Attorney, Agent, or Firm—George F. Helfrich

[57] ABSTRACT

Poly(1,2,4-triazoles)(PT) have been prepared by involving the aromatic nucleophilic displacement reaction of di(hydroxyphenyl)-1,2,4-triazole monomers with activated aromatic dihalides or activated aromatic dinitro compounds. The reactions are carried out in polar aprotic solvents such as sulfolane or diphenylsulfone using alkali metal bases such as potassium carbonate at elevated temperatures under nitrogen. The di(hydroxyphenyl)-1,2,4-triazole monomers are first synthesized by reacting bis(4-hydroxyphenyl) hydrazide with aniline hydrochloride at 250° C. in the melt and also by reacting 1,3 or 1,4-bis-(4-hydroxyphenyl)phenylenedihydrazide with 2 moles of aniline hydrochloride in the melt. Purification of the di(hydroxyphenyl)-1,2,4-triazole monomers is accomplished by recrystallization. This synthetic route has provided high molecular weight PT of new chemical structure, is economically and synthetically more favorable than other routes, and allows for facile chemical structure variation due to the availability of a large variety of activated aromatic dihalides.

8 Claims, No Drawings

POLY(1,2,4-TRIAZOLE) VIA AROMATIC NUCLEOPHILIC DISPLACEMENT

ORIGIN OF THE INVENTION

The invention described herein was jointly made by employees of the U.S. Government and an employee of BASF A.G., and may be manufactured and used by or for the Government for governmental purposes without the payment of any royalties thereon or therefor.

BACKGROUND OF THE INVENTION

1. Field of the Invention

The present invention relates generally to the field of poly(1,2,4-triazoles) and more particularly to poly(1,2,4-triazoles) created via aromatic nucleophilic displacement reaction of di(hydroxyphenyl)-1,2,4-triazoles with activated aromatic dihalides and activated aromatic dinitro compounds.

2. Description of the Prior Art

Poly(1,2,4-triazoles) (PT) are heterocyclic polymers which were first synthesized by the reaction of bistetrazoles and a bisimidoyl chloride. [C. J Abshire and C. S. Marvel, *Makromolecular Chemistry*, 44/46,388 (1961)]. Since then several different reaction pathways have been developed to prepare these polymers. The next method of preparing PT involves reacting a polyhydrazide with aniline. This reaction when carried out in polyphosphoric acid at approximately 175° C. produces PT of high molecular weight. [J. R. Holsten and M. R. Lilyquist, *Polymer Science*, A, 3, 3905 (1965)]. Another synthesis of PT involves reacting a bisamidrizone (also referred to as a bishydrazidine) at low temperatures with a diacid chloride. The resulting precursor polymer (poly N-acylamidrazone) is then cyclized either to the poly(1,2,4-triazole) or the poly(1,2,4-oxidiazole), depending on the reaction conditions. The poly(1,2,4-triazoles) prepared by this route have been shown to contain approximately 4% oxadiazole and uncyclized amidrazone along the backbone. [M. Saga and T. Shono, *Journal of Polymer Science*, B, 4, 869 (1966). Also, V. V. Korshak, "Heat Resistant Polymers" Israeli Translation, Keter Press Jerusalem, 1971, p. 244-248. See also P. M. Hergenrother, *Macromolecules*, 3(1), 10 (1970)]. The last method for preparing PT involves reaction of a dinitrile compound and bisnitrilimine. This route, however, yields only low molecular weight polymer. [J. K. Stille and F. W. Harris, *Journal of Polymer Science*, A-1, 6, 2317 (1968). Also, J. K. Stille and L. D. Gotter, *Journal of Polymer Science*, A-1, 7, 2492 (1969)]. For a general review of PT see "Thermally Stable Polymers" by P. E. Cassidy, Marcel Dekker, Inc. New York, p. 203.

SUMMARY OF THE INVENTION

The primary object of this invention constitutes new compositions of matter and a new process to prepare poly(1,2,4-triazoles). It concerns new PT, novel monomers, and the process for preparing the same.

Another object of the present invention is to provide new PT that are useful as composite matrix resins for aircraft and dielectric interlayers in electronic devices.

Another object of the present invention is the composition of several new di(hydroxyphenyl)-1,2,4-triazole monomers.

According to the present invention, the foregoing and additional objects were obtained by synthesizing PT by the nucleophilic displacement reaction of di(hydroxyphenyl)-1,2,4-triazole monomers with activated aromatic dihalides. The inherent viscosities ($\eta_{inh}$) of the PT ranged from 1.37 to 3.4 dL/g and the glass transition temperatures ($T_g$) ranged from 192° to 216° C. One polymer exhibited a crystalline melting temperature ($T_m$) of 377° C. Thermogravimetric analysis (TGA) showed no weight loss occurring below 300° C. in air or nitrogen with a 5% weight loss occurring at approximately 500° C. in air and nitrogen.

The synthesis of the di(hydroxyphenyl)-1,2,4-triazole monomer is represented in equation (1). The monomer can be prepared by either of the two routes shown. The chemistry can easily be extended to prepare similar di(hydroxyphenyl)-1,2,4-triazole monomers as shown in equation (2). The aromatic dihydrazides in some cases are commercially available or readily prepared from hydrazine and a di(acid chloride). The substitution of the hydroxy groups in either type of monomer may be meta-meta, para-para, or para-meta. The general reaction sequence of PT from each type of di(hydroxyphenyl)-1,2,4-triazole monomer is shown in equations (3) and (4).

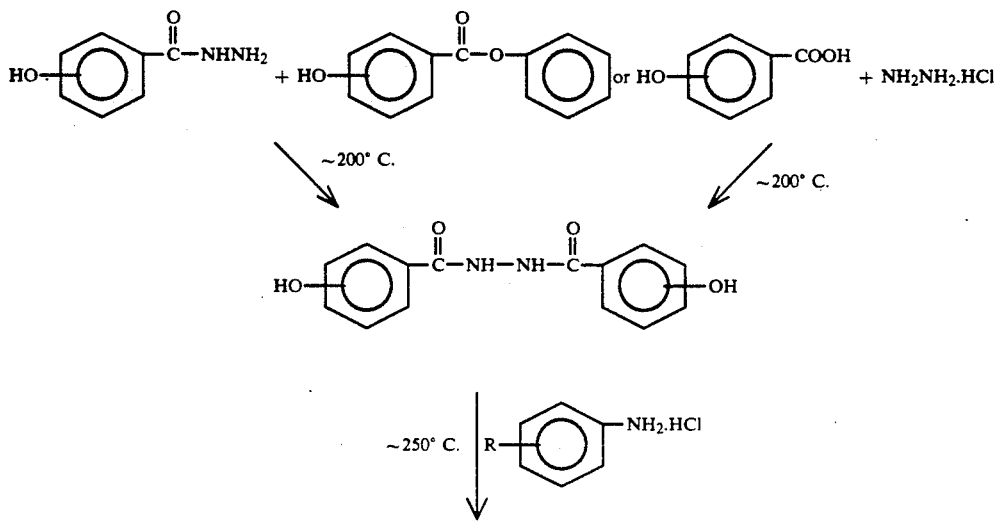

EQUATION 1

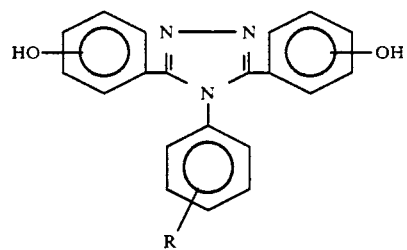
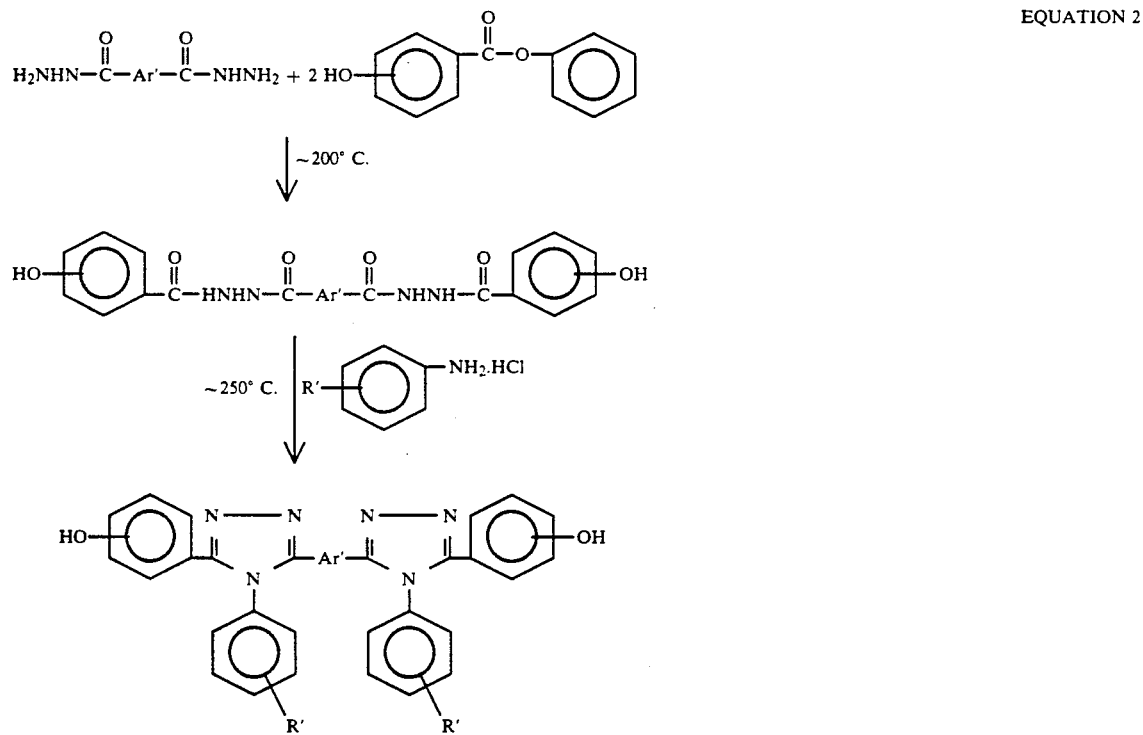
EQUATION 2
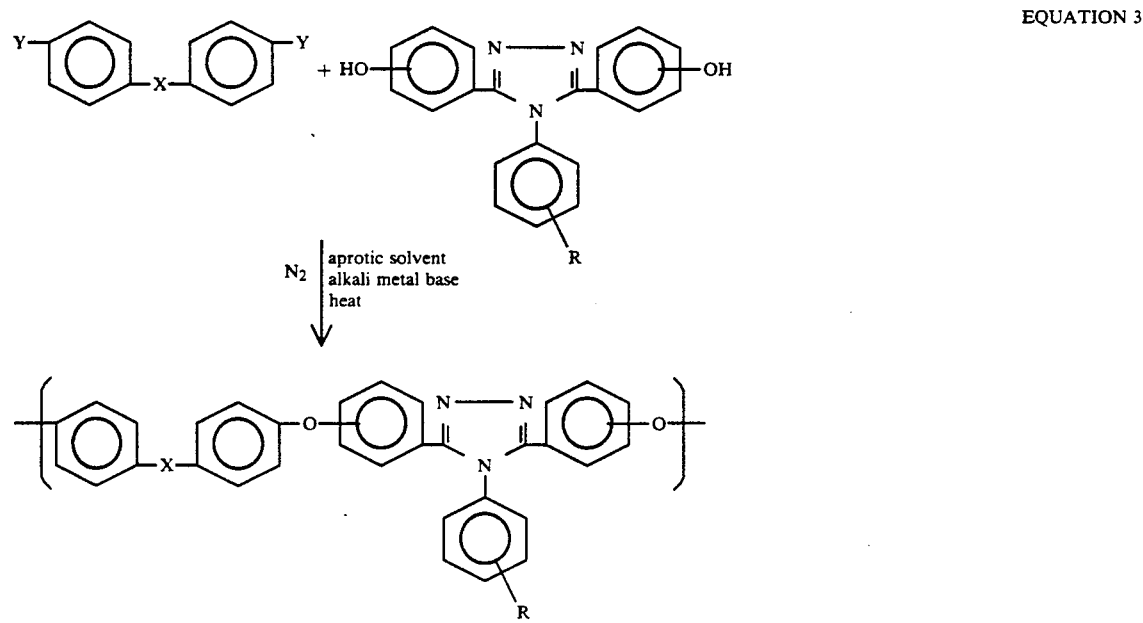
EQUATION 3

EQUATION 4

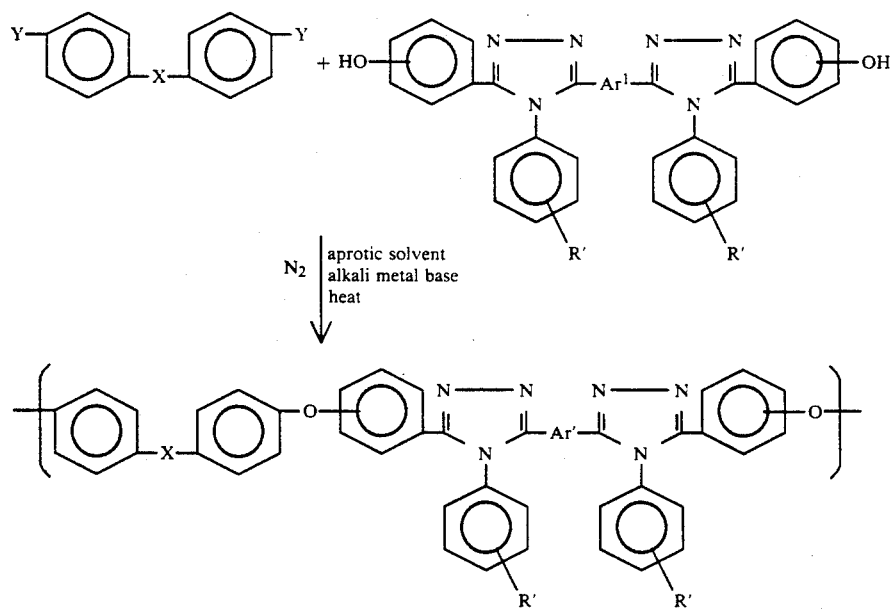

DESCRIPTION OF THE PREFERRED EMBODIMENTS

The present invention comprehends synthesizing poly(1,2,4-triazoles) via aromatic nucleophilic displacement reaction of novel di(hydroxyphenyl)-1,2,4-triazole monomers of two types with activated aromatic dihalides or activated aromatic dinitro compounds. The general reaction sequence is represented by equation (5).

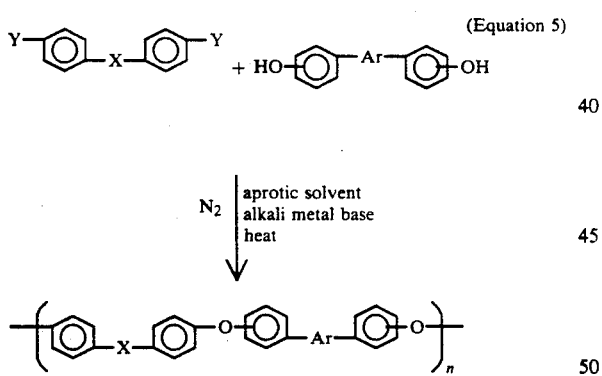

(Equation 5)

Y is a chloro, fluoro, or nitro group. X is selected from the group consisting of:

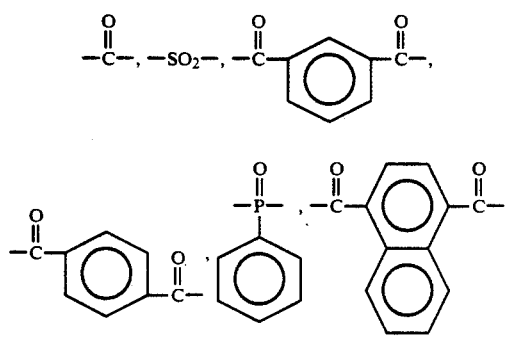

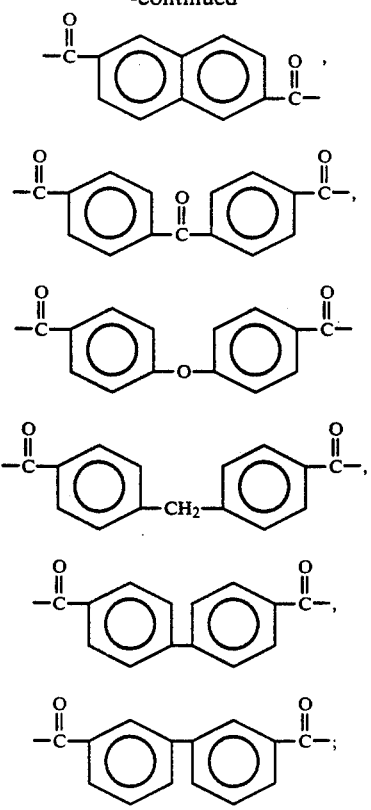

and Ar is selected from the group consisting of;

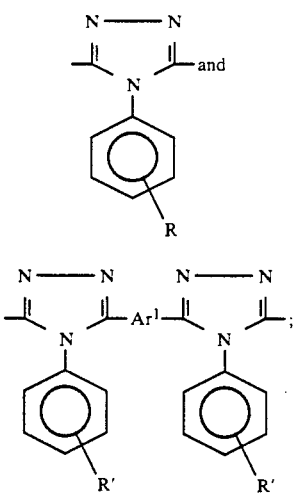

wherein Ar' is selected from the group consisting of:

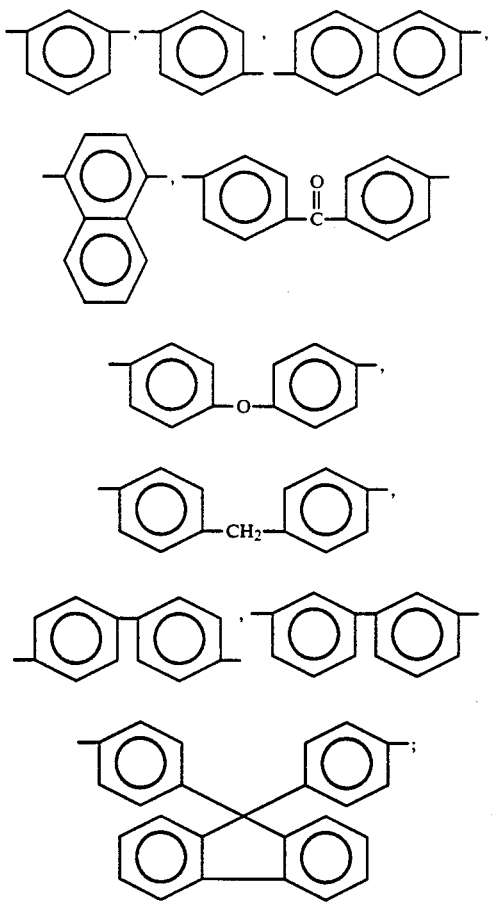

wherein R and R' are selected from the group consisting of: H, $CH_3$, $CH_2CH_3$, CN, $OCH_3$, F, Cl, Br, I, phenyl, and phenoxy; and wherein n is an integer between 4 and 100. The R groups may be substituted either meta or para and the R' groups may be substituted either meta-meta, para-para, or para-meta. Likewise, the hydroxy groups may be substituted either meta-meta, para-para, or para-meta. The reaction is carried out in a polar aprotic solvent such as N,N-dimethylacetamide, N-methylpyrrolidinone, sulfolane, diphenylsulfone, N-cyclohexypyrrolidinone, dimethylsulfoxide, or mixtures thereof using an alkali metal base such as $K_2CO_3$, $Na_2CO_3$, KOH, and NaOH. The reaction is then carried out with the application of heat under nitrogen.

The invention also comprehends the synthesis of several new di(hydroxyphenyl)-1,2,4-triazole monomers. The first was prepared by reacting a bis(4-hydroxyphenyl) hydrazide with aniline hydrochloride at 250° C. in the melt. The general reaction is given by equation (1) above.

The second reaction mechanism for the preparation of the monomer involved reacting 1,3 or 1,4-bis(4-hydroxyphenyl)phenylenedihydrazide with two moles of aniline hydrochloride in the melt. The general reaction mechanism for this reaction pathway is given by equation (2) above.

The di(hydroxyphenyl)-1,2,4-triazole monomers are then purified using standard recrystallization techniques.

Having generally described the invention, a more complete understanding thereof may be obtained by reference to the following examples, which are provided herein for purposes of illustration only and do not limit the invention.

EXAMPLES

Example I

The following example illustrates the reaction sequence shown in equation (1) above for the preparation of the monomer and the reaction shown in equation (3) above for the preparation of the polymer where X is equal to a carbonyl group and Y is F.

Monomer Synthesis

3,5-Bis(4-hydroxyphenyl)-4-phenyl-1,2,4-triazole

Into a 500 ml three neck round bottom flask equipped with a magnetic stirbar, nitrogen inlet, glass stopper, and distillation head was placed 4-hydroxybenzoic hydrazide (60.9 g, 0.4 mol) and phenyl-4-hydroxybenzoate (85.7 g, 0.4 mol). The mixture was heated to approximately 220° C. by use of a Wood's metal bath. The solids melt and phenol begins to evolve and was removed via the distillation head. After two hours, aniline hydrochloride (103.6 g, 0.8 mol) was added and the temperature was increased to 250° C. and held for two hours. The mixture was cooled and washed repeatedly in methanol to give a white solid (65.8 g, 50% yield). The solid was recrystallized from N,N-dimethylacetamide (approximately 225 ml) to give, after drying at 200° C. under vacuum, white needles (49.7 g, 37% yield) with a melting point of approximately 420° C. by differential thermal analysis (DTA). Elemental analysis for $C_{20}H_{15}N_3O_2$: Calculated: C, 72.93%; H, 4.59%; N, 12.76%; O, 9.72%. Found: C, 72.97%; H, 4.63%; N, 12.84%.

Poly(1,2,4-triazole) Synthesis

Into a 100 ml three neck round bottom flask equipped with a mechanical stirrer, thermometer, $N_2$ inlet, and reflux condenser was placed 3,5-bis(4-hydroxyphenyl)-4-phenyl-1,2,4-triazole (3.0000 g, 9.1 mmol), diphenylsulfone (25 g, 16% solids), and pulverized anhydrous potassium carbonate (2.77 g, 19.9 mmol, approximately 15% excess). The mixture was heated to approximately 180° C. under nitrogen. After 30 minutes at this temperature, 4,4'-difluorobenzophenone (1.9875 g, 9.1 mmol) was added. The temperature was increased to 280° C. and held for one hour, then increased to 300° C. for 30 minutes and 310° C. for an additional 30 minutes. The mixture was cooled to 200° C. and diluted with N-methylpyrrolidinone (NMP, 20 ml) and precipitated into methanol/acetic acid mixture in a high speed blender. The polymer is collected, washed successively with hot methanol, hot water, and hot methanol and dried at 125° C. for 16 hours in a forced air oven. White polymer (4.47 g, 97% yield) with a glass transition temperature of 207° C. was obtained. The inherent viscosity of a 0.5% solution in m-cresol at 25° C. was 2.94 dL/g.

methanol/acetic acid mixture in a high speed blender. The polymer was collected, washed successively with hot methanol, hot water, and hot methanol and dried at 125° C. for 16 hours in a forced air oven. White polymer (5.7 g, 93% yield) with a glass transition temperature of 192° C. was obtained. The inherent viscosity of a 0.5% solution in chloroform at 25° C. was 1.37 dL/g. Thin films cast from chloroform gave tensile strength, tensile modulus, and elongation at 25° C. of 13.3 Ksi, 395.6 Ksi, and 6.5% and at 150° C. of 6.7 Ksi, 345.5 Ksi and 5.4%, respectively.

Polymer characterization data and thin film properties of several polymers are set forth in the following Tables 1 and 2, respectively.

TABLE 1
POLYMER CHARACTERIZATION

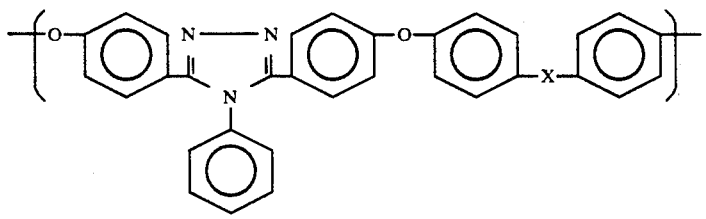

| POLYMER | X | ηinh, dL/g | T$_g$, °C. | T$_m$, °C. |
|---|---|---|---|---|
| P1 | —C(=O)— | 2.94 | 207 | — |
| P2 | —C(=O)—C$_6$H$_4$—C(=O)— (para) | 3.40 | 216 | 377 |
| P3 | —C(=O)—C$_6$H$_4$—C(=O)— (meta) | 1.37 | 192 | — |

Thin films cast from m-cresol gave tensile strength, tensile modulus, and elongation at 25° C. of 13.2 Ksi, 390.0 Ksi, and 8% and at 150° C. of 8.0 Ksi, 277.0 Ksi and 9.2%, respectively.

Example II

The following example illustrates the reaction sequence for the preparation of the poly(1,2,4-triazole) as shown in equation (3) above where X equals an isophthaloyl group and Y equals F.

Poly(1,2,4-triazole) Synthesis

Into a 100 ml three neck round bottom flask equipped with a mechanical stirrer, thermometer, N$_2$ inlet, and reflux condenser was placed 3,5-bis(4-hydroxyphenyl)-4-phenyl-1,2,4-triazole (3.2935 g, 10.0 mmol), diphenylsulfone (26 g, 19% solids) and pulverized anhydrous potassium carbonate (3.17 g, 22.9 mmol, 15% excess). The mixture was heated to approximately 180° C. under nitrogen. After 30 minutes at this temperature, 1,3-bis(4-fluorobenzoyl)benzene (3.2223 g, 10.0 mmol) was added. The reaction mixture was heated to 280° C. and held for one hour, increased to 300° C. for 30 minutes, and subsequently heated to 310° C. for an additional 30 minutes. The mixture was cooled to approximately 200° C., diluted with NMP (20 ml) and precipitated into

TABLE 2

| POLYMER | TEST TEMP., °C. | THIN FILM PROPERTIES | | |
|---|---|---|---|---|
| | | TENSILE STRENGTH, KSI | TENSILE MODULUS, KSI | ELONG., % |
| P1 | 23 | 13.2 | 390.0 | 8.1 |
| | 150 | 8.0 | 277.1 | 9.2 |
| P2 | 23 | 12.7 | 395.2 | 7.8 |
| | 150 | 8.0 | 275.6 | 9.5 |
| P3 | 23 | 13.3 | 395.6 | 6.5 |
| | 150 | 6.7 | 345.5 | 5.4 |

What is claimed is:

1. A poly(1,2,4-triazole) consisting of repeating units having the following general structural formula

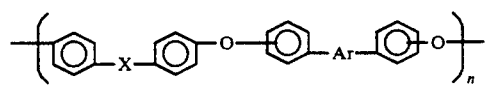

wherein the substitution of oxygen is selected from the group consisting of: meta-meta, para-para, and para-meta; wherein Ar is a radical selected from the group consisting of:

A. 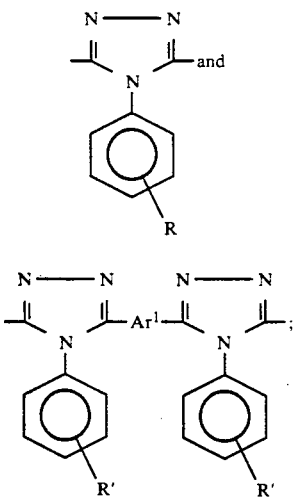

B. 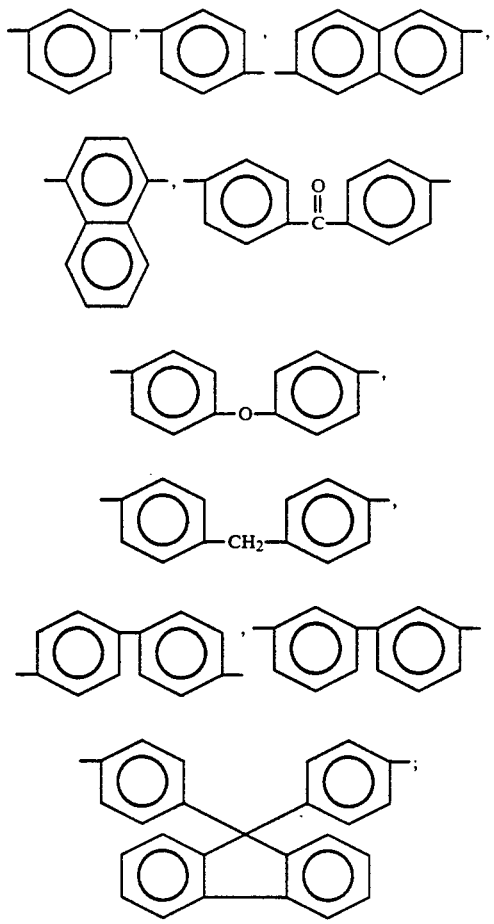

wherein R and R' are selected from the group consisting of: H, CH₃, CH₂CH₃, CN, OCH₃, F, Cl, Br, I, phenyl, and phenoxy; wherein the substitution of the R group is selected from the group consisting of: meta and para; wherein the substitution of the R' group is selected from the group consisting of: meta-meta, para-para, and para-meta; wherein Ar' is selected from the group consisting of:

wherein X is a radical selected from the group consisting of:

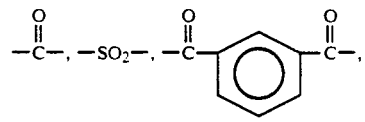

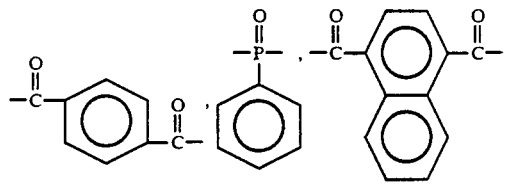

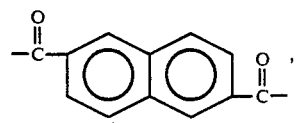

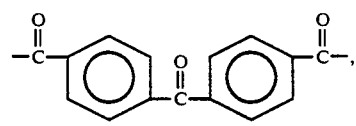

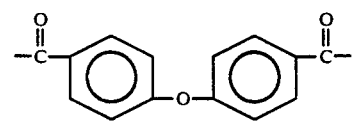

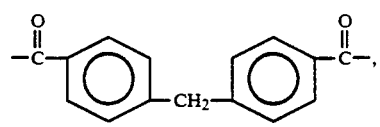

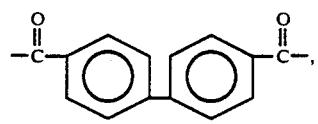

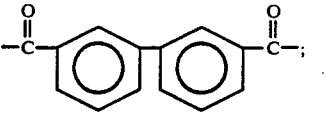

and wherein n is an integer between 4 and 100.

2. The poly(1,2,4-triazole) of claim 1 wherein Ar is a radical represented by

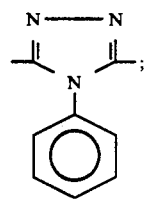

and X is selected from the group consisting of:

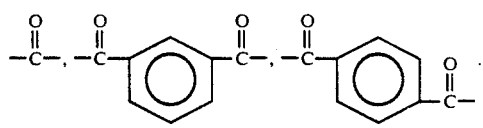

3. A process for synthesizing poly(1,2,4-triazoles) by aromatic nucleophilic displacement, which comprises reacting a di(hydroxyphenyl)-1,2,4-triazole having the general structural formula

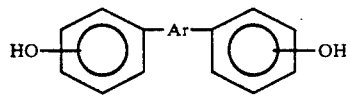

wherein the substitution of the hydroxy radicals is selected from the group consisting of: meta-meta, para-para, and meta-para; wherein Ar is a radical selected from the group consisting of:

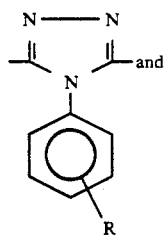   A.

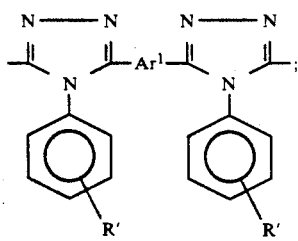   B.

wherein R and R' are selected from the group consisting of: H, CH$_3$, CH$_2$CH$_3$, CN, OCH$_3$, F, Cl, Br, I, phenyl, and phenoxy; wherein the substitution of R is selected from the group consisting of: meta and para; wherein the substitution of R' is selected from the group consisting of: meta-meta, para-para, and para-meta; and wherein Ar' is selected from the group consisting of:

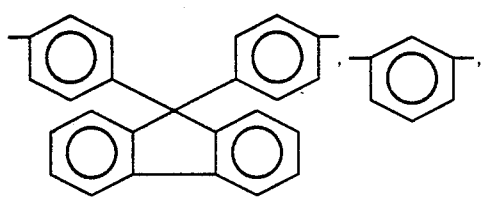

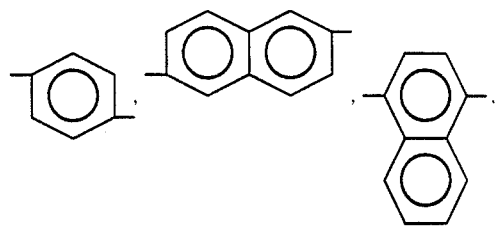

with an activated aromatic dihalide or dinitro compound having the general structural formula

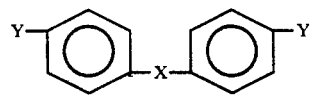

wherein X is a radical selected from the group consisting of:

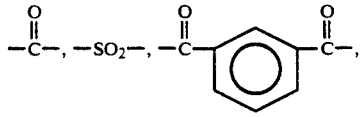

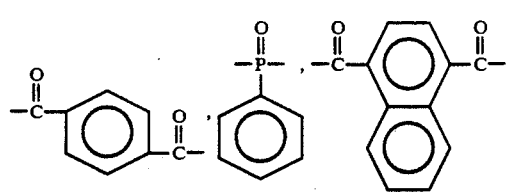

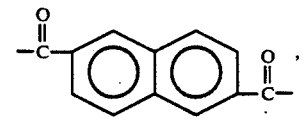

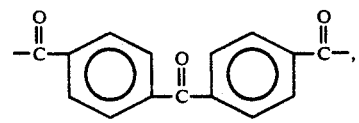

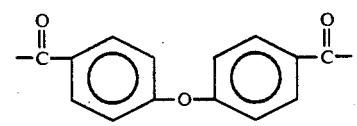

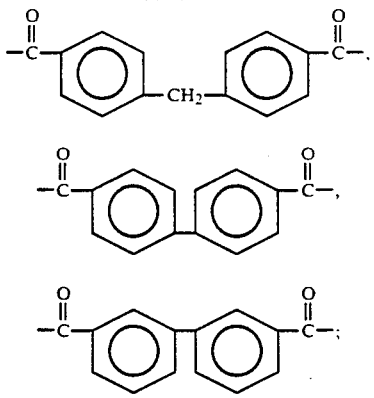

wherein Y is selected from the group consisting of: Cl, F, and NO$_2$; in a polar aprotic solvent selected from the group consisting of: N,N-dimethylacetamide, N-methylpyrrolidinone, sulfolane, diphenylsulfone, N-cyclohexypyrrolidinone, dimethylsulfoxide, and mixtures thereof; in the presence of an alkali metal base selected from the group consisting of: K$_2$CO$_3$, KOH, and NaOH; and with the application of heat.

4. The process of claim 3 wherein X is selected from the group consisting of:

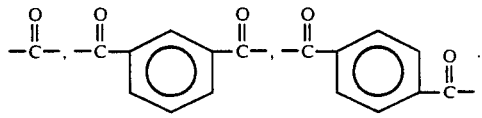

5. The process of claim 3 wherein Ar is

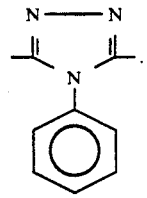

6. The process of claim 3 wherein Y is selected from the group consisting of: F and Cl.

7. The process of claim 3 wherein Y is F.

8. The process of claim 3 wherein the solvent is diphenylsulfone.

* * * * *